United States Patent [19]

Wheeler et al.

[11] Patent Number: 4,536,821

[45] Date of Patent: Aug. 20, 1985

[54] CERAMIC CAPACITORS AND DIELECTRIC COMPOSITIONS

[75] Inventors: Jennifer M. Wheeler, Loughton; Dawn A. Jackson, Old Harlow, both of England

[73] Assignee: Standard Telephones and Cables, plc, London, England

[21] Appl. No.: 584,343

[22] Filed: Feb. 28, 1984

[30] Foreign Application Priority Data

Mar. 10, 1983 [GB] United Kingdom ................ 8306659

[51] Int. Cl.$^3$ ...................... H01G 4/10; H01G 7/00; H01B 3/12

[52] U.S. Cl. .................................. 361/321; 29/25.42; 501/136

[58] Field of Search ........................ 361/321; 29/25.42; 501/136, 138; 252/520, 521; 423/598

[56] References Cited

U.S. PATENT DOCUMENTS

| | | | |
|---|---|---|---|
| 3,760,244 | 9/1973 | McClelland | 501/138 X |
| 4,086,649 | 4/1978 | Hanold | 361/321 |
| 4,335,216 | 6/1982 | Hodgkins et al. | 501/138 X |
| 4,339,544 | 7/1982 | Sakabe et al. | 501/136 |

*Primary Examiner*—Donald A. Griffin
*Attorney, Agent, or Firm*—Kerkam, Stowell, Kondracki and Clarke

[57] ABSTRACT

A dielectric composition, particularly suitable for the manufacture of ceramic capacitors, comprising lead magnesium niobate and lead zinc niobate. These may be additives, such as one or more oxide additives chosen from the group comprising silica, manganese dioxide, zinc oxide, nickel oxide, alumina, ceric oxide, lanthanum oxide and tungsten oxide, gallium oxide, titanium dioxide and lead oxide, or additives such as bismuth stannate. The compositions can be fired at temperatures between 980° and 1075° C. so that in the case of multilayer ceramic capacitors high silver content internal electrodes can be used. Higher dielectric constants, for example 9000 to 16,300, of the fired ceramics than conventional ceramics are obtained, thus permitting capacitor device size reduction.

22 Claims, No Drawings

CERAMIC CAPACITORS AND DIELECTRIC COMPOSITIONS

BACKGROUND OF THE INVENTION

This invention relates to ceramic capacitors and in particular, but not exclusively, to multilayer ceramic capacitors and dielectric compositions for use therein.

A multilayer ceramic capacitor basically comprises a stack consisting of a plurality of dielectric members formed of a ceramic material, with electrodes positioned between the members. The electrodes may be screen-printed onto the ceramic material, in the unfired state thereof, using conductive inks. A stack of screen-printed dielectric members is assembled, pressed together, cut into individual components, if appropriate, and fired until sintering occurs, in order to ensure non-porisity. The internal electrodes may be of rectangular form and cover the whole or part of the area of the adjacent dielectric layers. The internal electrodes in successive layers may be sideways stepped relative to one another or have elongate portions which cross one another, as described in British Application No. 7841677 (Ser. No. 2032689A) (A. Oliver-G. Mills 1-1).

With the conventional employed dielectrics the capacitors must be fired at temperatures of the order of 1200°–1400° C., which means that the internal electrodes must be of a suitable material to withstand such temperatures and that, therefore, expensive noble metals, such as platinum or palladium must be used. However, if the firing temperature can be reduced, by a suitable choice of the dielectric, then internal electrodes with a high silver content (50–100% silver) could be used, thus reducing costs for materials and manufacture. In British Application No. 8120605 (Ser. No. 2107300) (J. M. Wheeler 1) there is disclosed a dielectric composition which can be fired at a temperature between 950° C. and 1100° C. and can thus be used with high silver content internal electrodes. These low firing temperature dielectrics comprise lead magnesium niobate $PbMg_{\frac{1}{3}}Nb_{\frac{2}{3}}O_3$ with one or more of the following, namely lead titanate, lead stannate, lead zirconate, and some of these dielectric compositions have dielectric constants in the range 7500–10,000, which makes them particularly suitable for multilayer ceramic capacitors. The conventionally employed ceramic (U.S. coding Z5U) which are compatible with high silver content electrodes usually have dielectric constants lower than 6000. The electronics industry, generally, requires smaller components, and smaller and cheaper capacitors can be obtained by producing dielectrics which are compatible with high silver content electrodes and even higher dielectric constants than the 7500–10,000 range mentioned above with reference to British Application No. 8120605.

In British Application No. 8317265 (Ser. No. 2126575) (J. M. Wheeler 2x) there is disclosed a dielectric composition comprising lead magnesium niobate $PbMg_{\frac{1}{3}}Nb_{\frac{2}{3}}O_3$ non-stoichiometric lead iron niobate and one or more oxide additives, which may be chosen from silica, manganese dioxide, ceric oxide, lanthanum oxide, zinc oxide, alumina, tungsten oxide, nickel oxide, cobalt oxide and cuprous oxide. If, for example, three or more oxide additives are chosen from the first eight of the ten mentioned above, compositions having firing temperatures between 980° C. and 1075° C. may be obtained, the dielectric constants after firing being in the range 10,600 to 16,800, making them particularly suitable for small multilayer ceramic capacitors with high silver content electrodes. Additionally the dielectric composition may contain lead titanate ($PbTiO_3$).

SUMMARY OF THE INVENTION

It is an object of the present invention to provide alternative dielectric compositions which can be used with high silver content electrodes and have higher dielectric constants than the Z5U compositions.

According to one aspect of the present invention there is provided a dielectric composition comprising lead magnesium niobate and lead zinc niobate.

According to another aspect of the present invention there is provided a ceramic capacitor including dielectric comprising lead magnesium niobate and lead zinc niobate.

According to a further aspect of the present invention there is provided a multilayer ceramic capacitor including a plurality of layers of dielectric and a plurality of high silver content electrodes arranged between the dielectric layers, which dielectric layers are formed of lead magnesium niobate and lead zinc niobate.

According to yet another aspect of the present invention there is provided a method of manufacturing a multilayer ceramic capacitor including the steps of screen-printing a plurality of electrodes onto each of a plurality of dielectric members, assembling a stack of the resultant screen-printed members, pressing the stack together, dividing the stack into individual capacitor components and firing the individual components at a temperature between 900° to 1075° C., and wherein the dielectric comprises lead magnesium niobate and lead zinc niobate.

The dielectric composition may also include one or more oxide additives chosen from silica, manganese dioxide, zinc oxide, nickel oxide, alumina, ceric oxide, lanthanum oxide, tungsten oxide, gallium oxide, titanium dioxide and lead oxide. One or more of the following may also be added, bismuth stannate, bismuth titanate, lead stannate, lead zirconate and lead titanate with or without oxide additives. The examples of such dielectric compositions quoted hereinafter in Tables 1 to 4 fire at temperatures between 900° C. and 1075° C. and have dielectric constants after firing in the range 9000 to 17,600.

DETAILED DESCRIPTION

The dielectric compositions of the present invention are based on lead magnesium niobate, which may be generally referred to as $PbMg_{\frac{1}{3}}Nb_{\frac{2}{3}}O_3$, and lead zinc niobate, which may be generally referred to as $PbZn_{\frac{1}{3}}Nb_{\frac{2}{3}}O_3$, preferably approximately 75% (by weight) of the lead magnesium niobate and approximately 25% (by weight) of the lead zinc niobate, since these proportions appear to provide the highest dielectric constant values. Whereas the lead magnesium niobate is generally referred to as $PbMg_{\frac{1}{3}}Nb_{\frac{2}{3}}O_3$, the material actually employed and for which the results quoted in Tables 1 to 4 were obtained is non-stoichiometric $PbMg_{0.443}Nb_{0.5001}O_3$. The expression lead magnesium niobate is however conventionally understood to mean $PbMg_{\frac{1}{3}}Nb_{\frac{2}{3}}O_3$ which is not the niobate we have used. The niobate we have used is, generally, non-stiochiometric and approximates to "$Mg_{\frac{1}{2}}Nb_{\frac{1}{2}}$". Preferably the magnesium is in the range 0.35 to 0.5 and the niobium is in the range 0.4 to 0.6. Hence the expression $PbMg_{0.35\ to\ 0.5}Nb_{0.4\ to\ 0.6}O_3$.

Lead zinc niobate is conventionally understood to mean $PbZn_{\frac{1}{3}}Nb_{\frac{2}{3}}O_3$ whereas non-stoichiometric variations are possible. Preferably the zinc is in the range 0.3 to 0.5 and the niobium is in the range 0.6 to 0.7. Hence the expression $PbZn_{0.3\ to\ 0.5}Nb_{0.6\ to\ 0.7}O_3$.

In the following tables measured electrical parameters are quoted, for different firing temperatures, for the base material (Tables 1 and 2) and for the base material with added metallic oxides at the 0.1% (by weight) level (Table 3) or for other levels of added oxides or other additives (Table 4). The various compositions are fired for between one and two hours and aluminium electrodes suitably evaporated onto a surface thereof, so that the dielectric constant, the dielectric loss (tan δ) and the temperature dependence (in %) of the dielectric constant at −30° C. and +85° C. (for Tables 1 and 3) or +10° C. and +85° C. (for Tables 2 and 4) with respect to the dielectric constant at +25° C. can be measured.

TABLE 1

| Firing Temp. °C. | Dielectric Constant | Tan. δ (%) | Temp. Dependence (%) −30° C. | +85° C. |
|---|---|---|---|---|
| 1025 | 14500 | 1.1 | +7.6 | −55.0 |
| 1050 | 11100 | 0.78 | +8.0 | −50.3 |

TABLE 2

| Firing Temp. | Dielectric Constant | Tan δ (%) | Temp. Dependence (%) 10° C. | 85° C. |
|---|---|---|---|---|
| 980 | 14900 | 1.1 | +14.0 | −56.9 |
| 1000 | 13000 to 14500 | 1.0 to 1.1 | +8 to +15 | −55 to −56 |
| 1020 | 14500 to 15700 | 0.7 to 1.7 | +9 to +16 | −56 to −59 |
| 1040 | 12900 to 13800 | 1.05 to 1.45 | +10 to +13 | −54 to −56 |

The results obtained for the base material and quoted in Tables 1 and 2 indicate that the base material alone can be used as the dielectric composition for ceramic capacitors since they have values of the required order.

The properties of the base material can however be varied by the use of additives, the results for examples of which are quoted in Tables 3 and 4. In particular the very high dielectric constant values and very low firing temperatures obtained when PbO is added should be noted in Table 4, as well as the combination of high dielectric constant with temperature coefficient of capacitance well within the Z5U range when three additives $PbZrO_3$, $TiO_2$ and $Bi_2Ti_2O_7$ are incorporated into the dielectric.

It is anticipated that similar combinations of three or more additives chosen from those listed in Tables 3 and 4 will also give dielectrics having properties suitable for use in multilayer ceramic capacitors.

The composition including 5% lead oxide, which fires at temperatures less than 950° C. (900° C. quoted in Table 4), has a high dielectric constant value and temperature coefficient of capacitance within the Z5U range, is of particular interest since it enables firing with 100% silver electrodes.

TABLE 3

| Addition to base material 0.1% | Firing Temp. °C. | Dielectric Constant | Tan δ (%) | Temp. Dependence (%) −30° C. | +85° C. |
|---|---|---|---|---|---|
| $SiO_2$ | 1000 | 11400 | 1.3 | +8.5 | −53 |
|  | 1025 | 15150 | 1.0 | +12 | −57 |
|  | 1050 | 12450 | 0.87 | +10 | −52 |
| $MnO_2$ | 1000 | 10200 | 0.86 | +8 | −55 |
|  | 1025 | 12900 | 0.54 | +12.5 | −54 |
|  | 1050 | 11150 | 0.74 | +11 | −50.5 |
| ZnO | 1000 | 10100 | 1.22 | +7 | −50 |
|  | 1025 | 13950 | 1.00 | +11 | −55 |
|  | 1050 | 11800 | 0.95 | +9.5 | −52.5 |
| NiO | 1000 | 9550 | 1.17 | +7 | −48 |
|  | 1025 | 13800 | 0.82 | +14 | −57 |
|  | 1050 | 12050 | 0.74 | +9 | −50 |
| $Al_2O_3$ | 1000 | 10850 | 1.18 | +8 | −50 |
|  | 1025 | 14500 | 0.73 | +14 | −57 |
|  | 1050 | 11750 | 0.75 | +9 | −50 |
| CeO | 1000 | 10700 | 0.87 | +8 | −50 |
|  | 1025 | 12600 | 0.66 | +14 | −53 |
|  | 1050 | 9700 | 0.76 | +9 | −47 |
| $La_2O_3$ | 1000 | 9700 | 0.88 | +11 | −47 |
|  | 1025 | 13750 | 0.44 | +19 | −56 |
|  | 1050 | 10400 | 0.75 | +13 | −51.5 |
| $WO_3$ | 1000 | 10300 | 1.25 | +9 | −49 |
|  | 1025 | 15050 | 0.73 | +15 | −56.5 |
|  | 1050 | 10850 | 0.63 | +6 | −54.5 |
| $SiO_2MnO_2$ | 1000 | 11500 | 0.94 | +6 | −45 |
|  | 1025 | 12900 | 0.91 | +9 | −51.5 |
|  | 1050 | 10600 | 0.59 | +8.5 | −49 |
| $SiO_2ZnO$ | 1000 | 11550 | 0.95 | +8 | −51 |
|  | 1025 | 14700 | 0.80 | +11 | −56 |
|  | 1050 | 13000 | 0.98 | +10 | −55 |
| $SiO_2NiO$ | 1000 | 11950 | 1.34 | +5 | −47 |
|  | 1025 | 14250 | 0.92 | +13 | −56 |
|  | 1050 | 12100 | 0.96 | +8 | −52 |
| $SiO_2Al_2O_3$ | 1000 | 9000 | 1.01 | +10 | −51 |
|  | 1025 | 12400 | 0.79 | +14 | −55 |
|  | 1050 | 11900 | 1.04 | +9 | −53 |
| $SiO_2CeO$ | 1025 | 11000 | 0.55 | +10 | −53 |
|  | 1050 | 11450 | 0.80 | +11 | −52 |
|  | 1075 | 12250 | 1.03 | +7 | −55 |
| $SiO_2La_2O_3$ | 1025 | 11000 | 0.56 | +14 | −54 |
|  | 1050 | 12200 | 0.69 | +13 | −53 |
|  | 1075 | 13000 | 1.19 | +11 | −57.5 |
| $SiO_2WO_3$ | 1000 | 9550 | 1.17 | +7 | −51 |
|  | 1025 | 11700 | 0.64 | +7 | −55 |
|  | 1050 | 11500 | 1.02 | +7 | −53 |

TABLE 4

| Addition to base material | Firing Temp. C. | Dielectric Constant | Tan δ (%) | Temp. Dependence (%) +10° C. | +85° C. |
|---|---|---|---|---|---|
| 3 wt. % $Ga_2O_3$ | 980 | 11600 | 0.65 | +19 | −55 |
|  | 1020 | 15000 | 1.15 | +15.2 | −55.9 |
| 4 wt. % $Ga_2O_3$ | 980 | 13100 | 0.90 | +18 | −55 |
| 5 wt. % $Ga_2O_3$ | 980 | 10200 | 0.70 | +17 | −51 |
|  | 1020 | 12200 | 0.70 | +15.1 | −55.1 |
| 0.075 wt. % $TiO_2$ | 1020 | 15400 | 1.2 | +11.5 | −54.8 |
| 0.25 wt. % PbO | 950 | 15300 | 1.05 | +12.6 | −57.1 |
|  | 980 | 15100 | 1.1 | +11.0 | −55.8 |
|  | 1020 | 15600 | 1.05 | +12.5 | −56.5 |
| 1 wt % PbO | 950 | 15200 | 1.00 | +12.6 | −56.6 |
|  | 980 | 15600 | 1.05 | +11.4 | −56.5 |
|  | 1020 | 16300 | 1.05 | +12.1 | −56.3 |
| 5 wt. % PbO | 900 | 13400 | 1.05 | +13.1 | −53.5 |
|  | 980 | 16100 | 1.0 | +11.5 | −56.4 |

TABLE 4-continued

| Addition to base material | Firing Temp. C. | Dielectric Constant | Tan δ (%) | Temp. Dependence (%) +10° C. | +85° C. |
|---|---|---|---|---|---|
|  | 1020 | 16000 | 0.8 | +10.1 | −58.3 |
| 10 wt. % PbO | 900 | 11000 | 1.2 | +13.0 | −52.2 |
|  | 980 | 16250 | 1.15 | +13.3 | −56.1 |
|  | 1020 | 16300 | 1.0 | +13.3 | −56.9 |
| 0.5 wt % Bi$_2$(SnO$_3$)$_2$ | 1000 | 13200 | 0.70 | +23.7 | −54.0 |
|  | 1020 | 14100 | 0.60 | +21.0 | −54.7 |
| 1 wt. % Bi$_2$(SnO$_3$)$_2$ | 1000 | 11600 | 0.45 | +22.7 | −50.1 |
|  | 1020 | 11800 | 0.30 | +21.0 | −54.0 |
| { 1 wt. % Bi$_2$(SnO$_3$)$_2$ / 2 wt. % PbTiO$_3$ } | 1000 | 14100 | 0.95 | +17.3 | −50.9 |
|  | 1020 | 14000 | 0.95 | +14.0 | −53.0 |
| { 2 wt. % Bi$_2$(SnO$_3$)$_2$ / 6 wt. % PbTiO$_3$ } | 1020 | 12100 | 2.90 | +1.0 | −46.5 |
| 1 wt. % Bi$_2$Ti$_2$O$_7$ | 1020 | 10500 | 0.55 | +16.2 | −49.2 |
| 0.5 wt. % PbSnO$_3$ | 1020 | 14100 | 0.65 | +16.5 | −54.2 |
| { 0.5 wt. % PbSnO$_3$ / 5 wt % PbZrO$_3$ } | 1020 | 14300 | 2.55 | +4.9 | −49.9 |
| { 2 wt. % PbTiO$_3$ / 0.5 wt. % WO$_3$ } | 1040 | 15000 | 1.55 | +3.1 | −54.2 |
| { 1 wt. % PbTiO$_3$ / 0.05 wt. % La$_2$O$_3$ } | 1040 | 15000 | 1.75 | +5.2 | −55.7 |
| { 4 wt. % PbZrO$_3$ / 0.075 wt. % TiO } | 1020 | 14600 | 3.3 | +2.9 | −53.5 |
|  | 1040 | 1430 | 2.7 | 0.0 | −50.9 |
| (4 wt. % PbZrO$_3$) | 980 | 17600 | 2.9 | +8.9 | 51.7 |
| { 0.07 wt % TiO$_2$ / 0.8 wt % Bi$_2$Ti$_2$O$_7$ } | 1000 | 15200 | 2.6 | +8.8 | 52.0 |
|  | 1020 | 15800 | 2.7 | +8.3 | −52.2 |

Table 4 indicates the results obtained for oxides other than those quoted in Table 3, and for which the temperature dependence has been measured at different temperatures to those in Table 3. Results are also quoted for additives whose major proportions are other than simple oxides, e.g. bismuth stannate, bismuth titanate, lead stannate, lead zirconate and lead titanate.

In addition to the parameters quoted in Table 3, the temperature coefficient of capacitance, for the constituent examples quoted therein, shows Z5U characteristics, that is between 10° C. and 85° C. the capacitance varies less than +22%, −56% (EIA Code). Thus the invention provides dielectric compositions which fire at low temperatures 900° to 1075° C.), and are thus compatible with high silver content internal electrodes, have relatively high dielectric compositions (9000–17,600) and have Z5U temperature dependence characteristics. It is anticipated that additives comprising three or more of the oxides, added at the 0.1% level to the base material, will provide similar characteristics to those quoted for one or two.

A method of manufacturing a multilayer ceramic capacitor using the dielectric compositions of Tables 1 to 4 may comprise the step of screen printing a plurality of electrodes on each of a plurality of unfired dielectric sheets with a high silver content ink; assembling a stack of such printed sheets with the electrodes of alternate layers arranged relative to one another as appropriate to the particular construction employed, for example sideways stepped or overlapping cross-wise; pressing the sheets together with extra blank ceramic sheets applied to the top and bottom of the stack if required; cutting the sheets to form individual capacitor components and firing the individual components at a temperature between 900° and 1075° C. Subsequently the electrodes between every other sheet may be connected in a conventional manner (end terminated) by the appropriate application of conductive paint, for example, to opposite end (side) faces of the stack.

Whilst specific reference has been made to the use of high silver content electrodes, the dielectric compositions of the present invention may be used with other electrode materials, such as palladium, platinum or gold.

Whilst specific mention has been made of multilayer capacitors with internal electrodes, the dielectric compositions of the present invention can alternatively by used with other ceramic capacitor types, with or without electrodes that are fired with the ceramic.

We claim:

1. A dielectric composition consisting essentially of non-stoichiometric lead magnesium niobate and of lead zinc niobate.

2. A dielectric composition as claimed in claim 1 and comprising lead magnesium niobate PbMg$_{0.35\ to\ 0.5}$Nb$_{0.4\ to\ 0.6}$O$_3$ and lead zinc niobate PbZn$_{0.3\ to\ 0.5}$Nb$_{0.6\ to\ 0.7}$O$_3$.

3. A dielectric composition as claimed in claim 1 and comprising lead magnesium niobate PbMg$_\frac{1}{3}$Nb$_\frac{2}{3}$O$_3$ and lead zinc niobate PbZn$_\frac{1}{3}$Nb$_\frac{2}{3}$O$_3$.

4. A composition as claimed in claim 1 and including one or more oxide additives chosen from the group consisting of silica, manganese dioxide, zinc oxide, nickel oxide, alumina, ceric oxide, lanthanum oxide, tungsten oxide, gallium oxide, titanium dioxide and lead oxide.

5. A composition as claimed in claim 4, wherein the lead magnesium niobate and the lead zinc niobate together comprise a base material consisting essentially of 75% by weight of the lead magnesium niobate and 25% of the lead zinc niobate; and wherein the additives are added to the base material at the 0.1% by weight level.

6. A dielectric composition as claimed in claim 1 and including one or more additives chosen from the group consisting of bismuth stannate, bismuth stannate, lead stannate, lead zirconate and lead titanate.

7. A composition as claimed in claim 1 which can be fired at a temperature between 900° and 1075° C.

8. A composition as claimed in claim 1 and having a dielectric constant after firing of between 9000 and 17,600.

9. A ceramic capacitor including a dielectric composition according to any of claims 1 to 8.

10. A ceramic capacitor as claimed in claim 9 including high silver content electrodes fired with the dielectric.

11. A composition as claimed in claim 1 and including 5 wt% of lead oxide.

12. A composition as claimed in claim 11 wherein the lead magnesium niobate and the lead zinc niobate together comprise a base material consisting essentially of 75% by weight of the lead magnesium niobate and 25% by weight of the lead zinc niobate.

13. A ceramic capacitor including a dielectric composition as claimed in claim 11 and including 100% silver electrodes fired with the dielectric.

14. A dielectric composition as claimed in claim 1 and including a mixture of additives, said mixture consisting essentially of lead zirconate, titanium dioxide and bismuth titanate.

15. A multilayer ceramic capacitor including a plurality of layers of dielectric and a plurality of high silver content electrodes arranged between the dielectric layers, which dielectric layers consist essentially of non-stoichiometric lead magnesium niobate and of lead zinc niobate.

16. A multilayer ceramic capacitor as claimed in claim 15 wherein the lead magnesium niobate comprises $PbMg_{0.35 \ to \ 0.5}Nb_{0.4 \ to \ 0.6}O_3$ and the lead zinc niobate comprises $PbZn_{0.3 \ to \ 0.5}Nb_{0.6 \ to \ 0.7}O_3$.

17. A multilayer ceramic capacitor as claimed in claim 16 and including one or more oxide additives to the dielectric, which additives are chosen from the group consisting essentially of silica, manganese dioxide, zinc oxide, nickel oxide, alumina, ceric oxide, lanthanum oxide, tungsten oxide, gallium oxide, titanium dioxide and lead oxide, and wherein the dielectric is fired at a temperature between 900° and 1075° C.

18. A multilayer ceramic capacitor as claimed in claim 15 wherein said dielectric composition contains as an additive a mixture consisting essentially of lead zirconate, titanium dioxide and bismuth titanate.

19. A method of manufacturing a multilayer ceramic capacitor including the steps of screen-printing a plurality of electrodes onto each of a plurality of dielectric members, assembling a stack of the resultant screen-printed members, pressing the stack together, dividing the stack into individual capacitor components and firing the individual components at a temperature between 900° and 1075° C., and wherein the dielectric consists essentially of non-stoichiometric lead magnesium niobate and of lead zinc niobate.

20. A method as claimed in claim 19 wherein the lead magnesium niobate comprises $PbMg_{0.35 \ to \ 0.5}Nb_{0.4 \ to \ 0.6}O_3$ and the lead zinc niobate comprises $PbZn_{0.3 \ to \ 0.5}Nb_{0.6 \ to \ 0.7}O_3$.

21. A method as claimed in claim 20, and including one or more oxide additives to the dielectric, which additives are chosen from the group consisting of silica, manganese dioxide, zinc oxide, nickel oxide, alumina, ceric oxide, lanthanum oxide, tungsten oxide, gallium oxide, titanium dioxide and lead oxide.

22. A method as claimed in claim 20 including a mixture of additives in the dielectric composition, said mixture consisting essentially of lead zirconate, titanium dioxide and bismuth titanate.

* * * * *

UNITED STATES PATENT AND TRADEMARK OFFICE
CERTIFICATE OF CORRECTION

PATENT NO. : 4,536,821

DATED : August 20, 1985

INVENTOR(S) : Wheeler et al

It is certified that error appears in the above-identified patent and that said Letters Patent is hereby corrected as shown below:

In Claim 6 of the application, the compound bismuth stannate was included twice in the claim whereas the second compound should have read bismuth titanate.

Signed and Sealed this

Third Day of December 1985

[SEAL]

Attest:

DONALD J. QUIGG

Attesting Officer

Commissioner of Patents and Trademarks